Feb. 20, 1951        H. G. BOGART        2,541,976
INSTRUMENT FOR INSPECTING THE INTERIOR OF CAVITIES
Filed Nov. 22, 1947        2 Sheets-Sheet 1
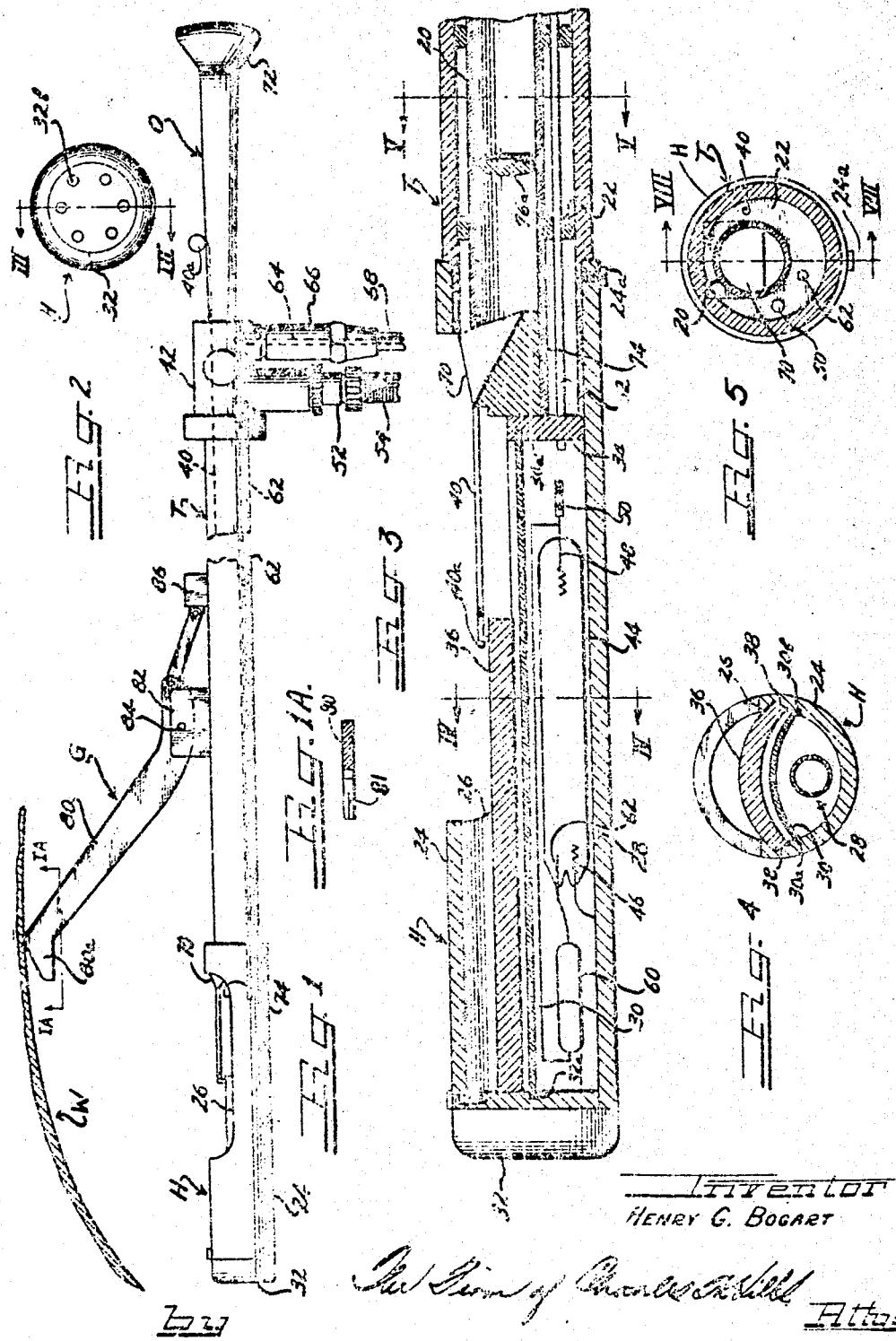
Inventor
HENRY G. BOGART

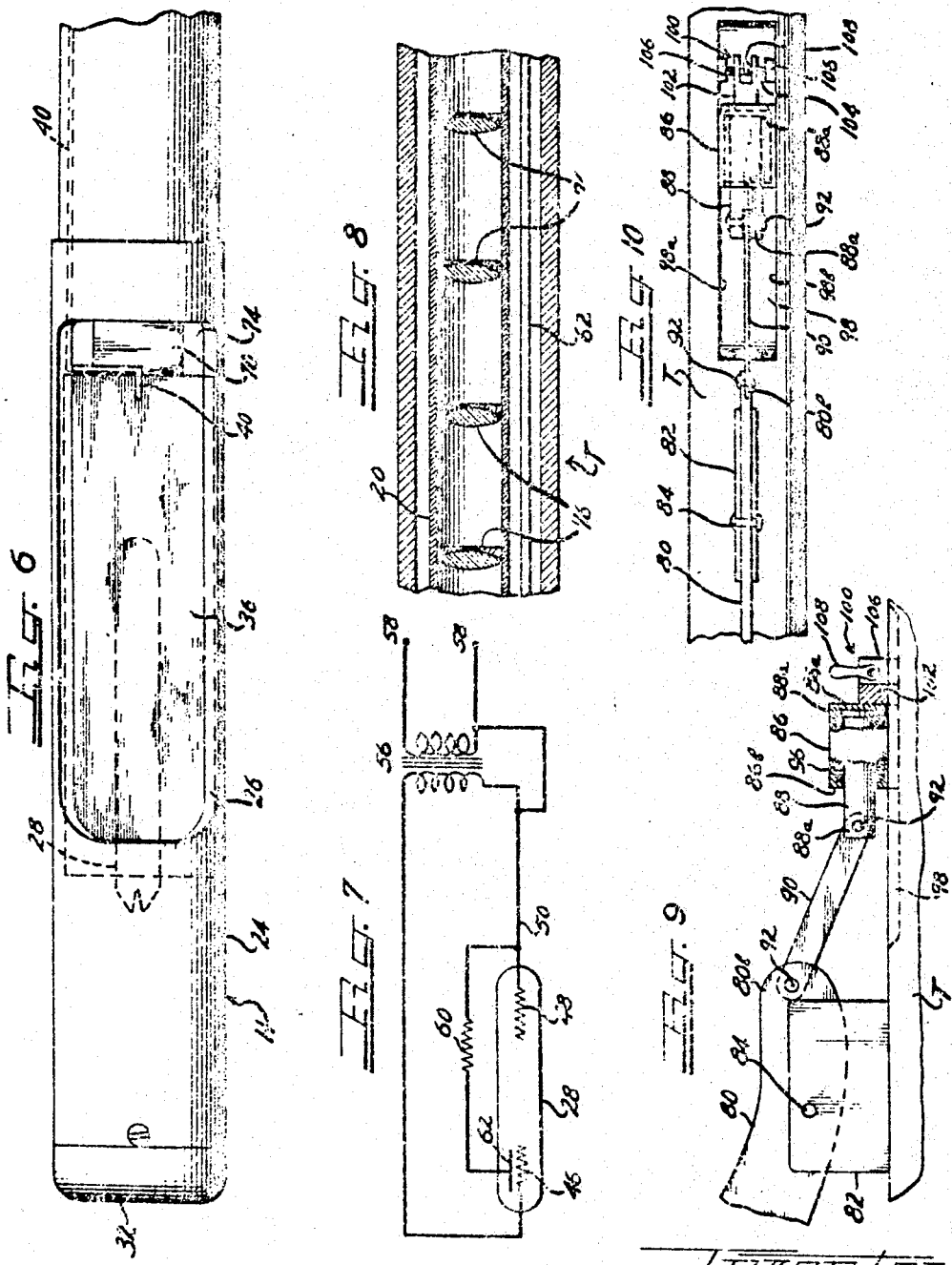

Patented Feb. 20, 1951

2,541,976

UNITED STATES PATENT OFFICE 2,541,976

INSTRUMENT FOR INSPECTING THE INTERIOR OF CAVITIES

Henry G. Bogart, Brooklyn, N. Y., assignor to Magnaflux Corporation, Chicago, Ill., a corporation of Delaware Application November 22, 1947, Serial No. 787,552

7 Claims. (Cl. 250—71)

This invention relates to optical instruments intended for use in inspecting the interior of cavities in objects.

In the manufacture of airplane propeller blades and similar objects requiring high strength with minimum weight, it has been found that by eliminating the center portions of the structure the weight is materially decreased without a substantial reduction in strength. However, blades constructed in this fashion have in the past been subject to failure by reasons of cracks, weld burns and the like on the inside surfaces of the cavity formed by the hollowed-out central portions. These imperfections have not been detectable for the reason that it has thus far been impossible to conduct a thorough examination of the interior walls of the cavity. Moreover, in guns and similar devices it is desirable to inspect the interiors of cavities to ascertain the presence of imperfections.

In accordance with the present invention, a lengthy inspecting tube capable of fitting into the cavity of an airplane propeller, gun, or similar device, is provided with a lamp at one end capable of producing ultraviolet light. A window is formed in the tube near the lamp to cause illumination of the interior of the cavity by light therefrom. A retractable filter covers this window and is attached to a rod or wire extending the length of the tube, and which is manipulatable from the end thereof selectively to illuminate the interior of the cavity solely with ultraviolet light or with both ultraviolet light and visible light. A prism, mirror, or other mechanism is placed on the end of the tube to form an image within a relatively smaller optical tube extending the length of the main tube and which is in optical cooperation with a suitable viewing device on the end of the main tube. Sharp focusing of the image of the interior of the cavity relative to the optical system is assured by a resiliently deflectable arm extending from the main tube in the region near the end thereof and which in its natural non-deflected condition extends the desired focusing distance relative to the tube. Loss or distortion of the image as the tube bends due to its own weight or to stresses placed upon it, is prevented by a plurality of lenses placed at intervals along the length thereof.

Further in accordance with the present invention, the lamp disposed at the end of the inspecting tube is cooled by a blast of nitrogen or similar inert gas that is incapable of producing ozone under the action of ultraviolet light. This gas is carried to the lamp by an auxiliary tube disposed within the main inspecting tube and which opens in proximity to the lamp. The heated or spent gas passes through openings provided in the end of the inspecting tube and into the interior of the cavity being inspected.

To detect weld burns and other visible imperfections on the interior of the cavity to be inspected, the apparatus is inserted therein and the filter shifted to the retracted position to illuminate the cavity with visible light. When it is desired to detect cracks and similar imperfections the cavity is first treated with a fluorescent substance of the type that flows into any cracks in the cavity and the apparatus is then inserted therein with the filter in the operative position, thus illuminating the interior of the cavity with ultra violet light and causing fluorescence of any material held by cracks facing the interior of the cavity.

It is therefore a general object of the present invention to provide an improved instrument for inspecting the interior of a cavity.

Another object of the present invention is to provide an improved instrument to inspect the interior of a cavity and which may be selectively operated to illuminate the cavity with ultraviolet light or visible light.

It is another object of the present invention to provide an improved instrument for inspecting the interior of a cavity and which contains elements operable from without the cavity selectively to illuminate the cavity by either ultraviolet light or visible light.

Still another object of the present invention is to provide an improved instrument for inspecting the interior of a cavity and which is provided with a novel cooling system which not only prevents overheating thereof but also eliminates any tendency of the instrument to produce deteriorating ozone gas.

A further object of the present invention is to provide an improved instrument for inspecting the interior of a cavity and which is provided with means operable to focus the optical system to assure an image of maximum sharpness.

It is yet another object of the present invention to provide an improved instrument for inspecting the interior of a cavity and which is constructed to avoid distortion of images due to deflections of the instrument.

Still another object of the present invention is to provide an improved instrument for inspection of cavities and which includes elements to identify the position of a predetermined point on the image as seen through the viewing mechanism.

My invention further resides in features of construction, combination and arrangement whereby an improved instrument for the inspection of the interior of a cavity is provided and which is rugged in construction and reliable in operation to the end that a unit of maximum utility is achieved.

The novel features which I believe to be characteristic of my invention are set forth with particularity in the appended claims. My invention itself, however, both as to its organization and method of operation, together with further objects and advantages thereof may best be understood by reference to the following description taken in connection with the accompanying drawings.

On the drawings:

Figure 1 is a side elevation view of a complete mechanism constructed in accordance with the principles of the present invention;

Figure 1A is a cross sectional view through the axis 1A—1A, Figure 1;

Figure 2 is an enlarged end view of the head portion of the mechanism of Figure 1;

Figure 3 is a cross sectional view through the axis III—III, Figure 2, and showing parts in elevation;

Figures 4 and 5 are cross sectional views through the axes IV—IV and V—V, Figure 3, respectively;

Figure 6 is a fragmentary top plan view of the head portion of the mechanism of Figure 1;

Figure 7 is a schematic circuit diagram of an electrical circuit that may be used with the mechanism of the present invention;

Figure 8 is a fragmentary cross sectional view through the axis VIII—VIII, Figure 5, and showing parts in side elevation;

Figure 9 is an enlarged fragmentary side elevational view of the gage structure of the mechanism of Figure 1, with parts in cross section; and Figure 10 is an enlarged fragmentary top plan view of the gage structure of the mechanism of Figure 1.

As shown on the drawings:

Referring now to Figure 1, which is a view showing a complete mechanism constructed in accordance with the principles of the present invention, the mechanism includes a lengthy inspecting tube T having at one end the head portion H and at the opposite end the operating portion O. The head portion H contains a source of ultraviolet light, together with the necessary lenses and a retractable filter to permit illumination of the interior of a cavity having the wall W. The observing or operating portion O includes connector elements for attachment to the sources of electrical energy and cooling gas for the elements contained in the head portion and, in addition, includes an eyepiece to observe the image of the interior of the cavity under inspection. The tube T mechanically connects the head portion and the operating portion and, in addition, supports the gage G which fixes the position of the optical system relative to the wall W of the cavity.

The structure of the interior of the tube T may best be understood by inspection of Figures 3 and 5, the former showing an axial cross sectional view of this tube and the latter a transverse cross sectional view. As will be evident from these views, an optical tube 20 is mounted in the upper portion of the inspecting tube T and is supported therein by spaced inserts 22 located at intervals along the length thereof. These inserts may be of brass or other suitable material machined to fit snugly within the interior of the inspecting tube T and to receive snugly the optical tube 20 and other elements within the inspecting tube to sustain them in position. Although a relatively small spacing between the inserts 22 is shown in Figure 3, it will be apparent that the number of these inserts may be varied in accordance with the mechanical strength of the tubes 20 and T.

The head portion H is housed in tube 24 which snugly fits over the tube T and has a cutout portion 26 to form a window through which passes the light necessary to illuminate the interior of a cavity being inspected. The lamp 28 is disposed immediately below this window and in the bottom portion of the tube 24. This lamp constitutes the source of the ultraviolet and visible light which illuminates the cavity under inspection. The lamp 28 is shown in elevational view in Figure 3 and transverse cross section in Figure 4. A lens 30 is fitted over the lamp 28 and acts to assure uniform illumination of the interior of the cavity from the opening or window 26. This lens may be supported within the tube 24 by any suitable method, as for example by grooves 30a and 30b in end cap 32 and supporting insert 22, respectively.

A shiftable retractable filter 36 is interposed between the lens 30 and the window 26 to cut off all visible portions of the light spectrum issuing from the lamp 28. This filter may be supported for shifting movements along the axis of tube 24 by any suitable method. By way of illustration and not by way of limitation, this filter is shown supported within tube 24 by two parallel grooves 38, Figure 4, cut in the interior of that tube to fit snugly the filter to sustain the same in position while permitting shifting movements thereof along the tube.

Shifting or retracting movements of the filter 36 are controlled by the wire or rod 40 which has a downwardly extending tip portion 40a fitting into a suitable opening on the end of the filter 36. This rod extends through the tube T and out through the end portion of the housing 42 of the operating portion O. At its end, the rod 40 is shaped to form a loop 40a that may readily be grasped by the operator to shift the filter 36 from the retracted position shown in Figure 3 to the operating position shown in Figure 6.

The lamp 28 is a high pressure mercury vapor lamp having a quartz envelope 44 containing mercury which vaporizes to form the conducting medium through which the arc passes. Illumination having a considerable proportion of ultra-violet light is produced by current flow between the two operating electrodes in the opposite ends of the lamp indicated at 46, and 48, Figure 5. Electrode 46 is connected to the tube 24 and electrode 48 is connected to insulated wire 50 which extends through the tube T as shown in Figure 5 and through the housing 42 of the observing portion O to the connector indicated at 52. Cable 54 is attached to this connector for supply of electrical energy to the lamp 28 from a suitable source.

The filter 36 may be any one of the various filters capable of opposing passage of visible light while permitting passage of ultraviolet light. When it is in the operating position shown in Figure 6, this filter extends completely over the window 26 and thus cuts off all visible light issuing from the lamp 28. During this condition, the head H illuminates the interior of the cavity being inspected with ultraviolet light only since the filter 36 intercepts all the visible components of the light produced by the lamp 28. When the loop 40a, Figure 1, is pushed backwardly by suitable pressure by the operator, the filter 40 is shifted backwardly to the retracted position shown in the view of Figure 3. This exposes a portion of the lamp 28 for direct illumination of the cavity being inspected and thus causes visible light to enter the cavity.

I have discovered that a lamp of the high pressure mercury arc type produces ample light in the visible spectrum to illuminate the interior of a cavity under inspection with the filter 36 in the position shown in Figure 3.

The energizing circuit for lamp 28 is shown diagrammatically in Figure 7. The transformer 56, located externally to the tube T has its primary winding connected to terminals 58 to which a source of alternating electromotive force is also connected. One terminal of the secondary of transformer 56 is connected to conductor 50 through suitable cable 54, Figure 1, and the opposite terminal of the secondary of transformer 56 is connected to the tube T by the cable 54, thus to impress the voltage of the secondary of transformer 56 across the lamp 28. A starting electrode 62 is disposed in the end of the lamp 28 adjacent to the electrode 46 and is connected through resistance 60 to the electrode 48 to initiate the discharge in lamp 28.

It is the function of tube 62 to conduct cooling gases to the lamp 28. To this end the tube 62 extends the length of tube T and into the housing 42 of the observing portion O. This tube opens into channel 64 in housing 42, which channel passes through the connector portion 66 of housing 42, to which the hose 68 is attached. As indicated in Figure 3, the tube 62 passes through the insert 34 and opens just beyond this insert, thus causing the gases passed through the tube to circulate about the lamp 28. As shown in Figure 2, the end 32 of the head H is provided with a plurality of holes 32a through which the heated or spent gases flow after passing about tube lamp 28.

The gases passed through the tube 62 not only provide a supply of cooling medium to maintain the lamp 28 at the temperature range most suitable for effective operation but in addition they prevent generation of deteriorating ozone gas by that lamp. To achieve this end, these gases are of some inert gas such as, for example, nitrogen, which does not contain oxygen and does not react to the ultraviolet radiations. Thus the interior of the head H is not exposed to the corrosive action of ozone that would otherwise be produced and the repair and maintenance of the unit is correspondingly simplified.

The tube 24 which forms a housing for the head assembly H may be removed from the remainder of the mechanism for repair or replacement. By way of example and not by way of limitation, the tube 24 may be secured to tube T by a set screw 24a.

The viewing mechanism of the present invention includes the auxiliary tube 20 which is sustained within main or inspecting tube T and which opens into prism 70 at one end and the eyepiece 72 at the other end. It is the function of prism 70 to deflect the light rays from the inner surface of the cavity under inspection and to cause them to pass down the tube 20 where the first lens 76a acts to produce an image in tube 20 in a plane normal to the axis thereof. To this end, this prism is supported by insert 74 which fits snugly in the end of the tube 20 and holds it against the upper portion thereof which is cut off to fit the contour of the prism. The prism 70 may be seen in end view in Figure 5.

As shown in the view of Figure 8, a plurality of spaced lenses 76 are disposed at intervals along the length of auxiliary tube 20. These lenses are preferably of the achromatic type and may be spaced every four inches, thus using a total of 13 lenses in a five foot tube.

The disposition of lenses 76 at frequent intervals along the length of the tube 20 prevents loss or distortion of the image when the tubes T and 20 are inadvertently flexed either by their own weight or by the manner in which they are handled. It is desirable to construct these tubes of small diameter to fit into small openings to reach relatively inaccessible cavities. As a consequence of these small diameters, these tubes are relatively flexible and flex under their own weight to a degree sufficient to obstruct direct view of an image formed near the prism end of tube 20. Each lens 76 acts to produce an image on one side corresponding to the image located on the other side, and since the axis of each lens is shifted as the tube 20 flexes, the positions of these images likewise shift to produce the image at the eyepiece 72 even though direct view through the tube 20 is not possible. Thus each successive lens picks up the image of the interior of the cavity on one side and forms a like image on the opposite side.

The eyepiece 72 includes lenses suitable for viewing the image produced by the lenses 76 immediately adjacent this eyepiece. Any one of several mechanisms well known in the art may be used for this purpose. Preferably, though not necessarily, this eyepiece may contain an ocular lens system capable of magnifying the image produced by the lens 76 immediately adjacent the eyepiece, thus to permit visual inspection of the image with maximum detail.

It is the function of the gage G, Figure 1, to fix the distance between the head H and the inner wall W of the cavity being inspected at the distance necessary to produce a sharply focused image. Since wide-angle, short focal distance lens elements are desirable to achieve a maximum area of inspection, this focusing is relatively critical and it is difficult and even impossible to achieve the desired focusing by merely inserting the lengthy tube T in the cavity. The gage G provides a mechanism whereby the operator can fix the distance to the wall of the cavity at the proper value and thereby assure clear sharply focused images.

The gage G comprises an arm 80 which is pivotally supported from the upstanding bracket 82 by the pin 84. The bracket 82 is fixed to the upper portion of the tube T. The remote end 80a of the arm 80 is rounded off to slide easily against the wall W of the cavity being inspected and permit the arm 80 readily to rotate about pin 84 without any tendency to catch when the instrument is inserted or removed from the cavity.

The arm 80 is biased to a predetermined position relative to the tube T to cause the end 80a to reach the selected distance from the head H to provide sharp focusing of the image. Adjustable mechanism is provided to alter the position to which the arm 80 is biased to accommodate different optical system components. By way of example, this mechanism may include a housing 86 in which rides a plunger 88 having a bifurcated end portion 88a to receive the arm 90 and the pin 92 which pivotally supports that arm in the plunger 88. At its opposite end, arm 90 is received in a similar bifurcated end portion 80b of the arm 80 and is pivotally supported therein by the pin 92.

The plunger 88 is provided with an end flange 88a upon which one end of spring 96 is bottomed as will be evident from the broken away portion of the view of Figure 9. The opposite end of the spring 96 is bottomed on the inwardly extending flange portion 86b of the housing 86 as also indicated in the broken away cross sectioned portion of the view of Figure 9. Thus spring 96 normally holds the end flange 88a of plunger 88 against the wall 86a of housing 86 and lifts the arm 80 a predetermined angle relative to the axis of tube T, thus causing the end 80a of the arm 80 to extend the desired distance from the head H. When the arm 80 rests against the wall W of the cavity being inspected, the operator is assured that the head H is in position for proper focusing of the image. He can determine that this fact exists by the force transmitted to the end of tube T when the arm 80 rests against the wall of the cavity.

Adjustment of the distance arm 80 extends from the axis of the tube T may be achieved by mounting the housing 86 to ride in a suitable track on the surface of the tube T. This track is indicated at 98, Figure 10, and has oppositely disposed walls 98a and 98b between which the housing 86 rides. An adjustable assembly 100 likewise rides in this track and is attached to the housing 86 by the arm 102. This arm supports the turnbuckle screw 104 which has shoes 106 threadedly secured to its opposite ends to engage the walls of the track 98. An arm 108 is fixed to turnbuckle screw 104 to permit rotation thereof selectively to engage or disengage the shoes 106 against the walls of the track 98, thereby permitting adjustment of the position of housing 86 and hence the distance between the housing H and the wall of the cavity when the arm 80 engages that wall.

In addition to providing a method of accurately fixing the distance from the head H to the wall W, the arm 30 of gage G bears a fluorescent marker which is visible to the inspector at all times. This marker is in the form of a hair line, as shown at 81, Figure 1A is made of some suitable material which fluoresces upon application of ultraviolet light. By providing this reference hair line at a point in the field of vision, it is always possible for the inspector of the instrument to identify a known portion of the field of vision and to concentrate his attention thereon. Moreover, he is always advised that the ultraviolet light source is in good operating condition and can act with assurance that he will observe the presence of any fluorescent material in the wall W. Thus the possibility of the light source going out or becoming ineffective, together with the possibility of the inspector failing to view in the right portion of the optical system to see the wall, is avoided.

The apparatus of the present invention is particularly adapted to the inspection of cavities by methods such as that disclosed in Robert C. Switzer Patent 2,259,400. In accordance with this method, the article to be inspected is immersed in or painted with a penetrant liquid containing a fluorescent substance capable of glowing under ultraviolet illumination. After application of this liquid to the surface to be inspected, the liquid is superficially removed by wiping or drying, leaving only deposits of the liquid and fluorescent substance in the cracks or flaws in the surface. When ultraviolet illumination is applied to the surface by the apparatus of the present invention, the fluorescent material radiates visible light and the presence of cracks detected by observing the image through the eyepiece 72. Weld burns and similar normally visible imperfections in the walls of the cavity are, of course, detected by shifting filter 36 to the retracted position.

While I have shown a particular embodiment of my invention, it will of course be understood that I do not wish to be limited thereto since many modifications both in the elements employed and their cooperative structure may be made without departing from the spirit and scope of my invention. I, of course, contemplate by the appended claims to cover all such modifications and alternative constructions as fall within the true spirit and scope of my invention.

I claim as follows:

1. An instrument for inspecting the interior of a cavity illuminated with invisible light including in combination, a head for insertion in said cavity, a source of ultraviolet light within said head, viewing elements mounted in said head and operable to produce an image of the interior of said cavity through fluorescence of said cavity by the action of said ultraviolet light, and a member mounted in spaced relationship from said head and in the field of view of said elements, said member having a mark thereon of material capable of converting said invisible light to visible light to identify a predetermined point in said image.

2. An instrument for inspecting the interior of a cavity illuminated with invisible light including in combination, a lengthy tube to be inserted in said cavity, said tube having a window to permit passage of light from said cavity to the interior of said tube, a source of ultraviolet light within said window, optical elements to produce an image of said cavity as seen from said window, viewing elements located at the remote end of said tube to permit viewing said image to inspect the interior of said cavity, and a member extending from said tube to the field of vision of said element and bearing a marking of material capable of converting said invisible light to visible light to form a reference point on said image.

3. A device for illuminating the interior of a cavity comprising in combination, a lengthy tube having a head portion at one end, a source of both visible and invisible light disposed in said head portion said head portion having a window to illuminate said cavity when said lamp is operating, a filter capable of transmitting only said invisible light slidably supported relative to said window to cover or uncover said window, and a rod in engagement with one end with said filter and extending the length of said tube to slide said filter and selectively interpose said filter over said window.

4. An instrument for illuminating the interior of a cavity with ultraviolet light, said instrument comprising a lengthy tube, a source of ultraviolet light disposed near one end of said tube, a pipe in said tube opening at a point in proximity to said source and extending toward the opposite end of said tube, and a source of oxygen-free inert gas under pressure exceeding the pressure of about said first source connected to said pipe to cause a stream of inert gas to pass about said source and prevent production of corrosive gases.

5. An instrument for inspecting the interior of a cavity including in combination a lengthy tube having one end to be inserted in said cavity, said tube having a window near said end, a mercury vapor lamp disposed in said tube near said source to illuminate the interior of said cavity, an electrical conductor extending from said lamp to the other end of said tube for connection with a source of electrical energy for said lamp, a filter capable of transmitting only ultraviolet light shiftably disposed in said tube to cover said window, a rod attached at one end to said filter and extending through said tube said other end thereof to permit shifting said filter to expose said cavity to direct illumination from said lamp, an auxiliary tube within said first tube and opening in proximity to said lamp, a source of nitrogen connected to said auxiliary tube to cause cooling gas flow about said lamp, a second auxiliary tube opening near the end of said window, optical elements to produce in said second tube an image of said cavity as seen from said window, lenses disposed in said last tube at spaced intervals to transmit said image to the end thereof, and an arm pivotally supported from said end of said tube and yieldably biased to a position where its remote end is spaced from said tube by the distance from said tube at which an image of the interior of said cavity is sharply focused, said arm having a fluorescent marking to form a reference point on the viewing system.

6. In an instrument for illuminating the walls of a cavity having irregularities thereof coated with a fluorescent substance, a lengthy tube portion arranged for insertion within said cavity, means for spacing the head of said tube a predetermined distance from the walls of said cavity, the head of said tube having a window therein, a source of light emitting both visible and ultraviolet rays disposed within said head in registry with said window to illuminate said cavity, a filter capable of transmitting only ultra-violet light arranged for sliding movement across said window, and operating means along said tube for selectively moving said filter across said window.

7. In an instrument for illuminating the walls of a cavity having irregularities thereof coated with a fluorescent substance, a lengthy flexible tube arranged for insertion within said cavity, said tube having a window therein, a source of light emitting both visible and ultra-violet light disposed in proximity to one end of the tube in registry with said window to illuminate selected portions of said cavity, a filter capable of transmitting only ultra-violet light disposed in sliding engagement across said window, operating means extending along said tube for moving said filter across said window, and a plurality of lenses mounted in said tube at spaced intervals, each of said lenses being arranged to pick up the image from the next preceding lens and form an image for the next succeeding lens, and viewing elements to observe the image produced at the last of said lenses.

HENRY G. BOGART.

REFERENCES CITED

The following references are of record in the file of this patent:

UNITED STATES PATENTS

| Number | Name | Date |
|---|---|---|
| 675,463 | Boyce | June 4, 1901 |
| 1,195,912 | Cummings | Aug. 22, 1916 |
| 1,431,613 | Wittner | Oct. 10, 1922 |
| 1,602,233 | Lyon | Oct. 5, 1926 |
| 1,643,719 | Loeck | Sept. 27, 1927 |
| 1,698,124 | De Zeng | Jan. 8, 1929 |
| 2,034,388 | Cemach | Mar. 17, 1936 |
| 2,168,225 | Lewin | Aug. 1, 1939 |
| 2,261,215 | Bird | Nov. 4, 1941 |
| 2,325,831 | Cameron | Aug. 3, 1943 |
| 2,334,475 | Claudet | Nov. 16, 1943 |
| 2,341,745 | Silverman et al. | Feb. 15, 1944 |

FOREIGN PATENTS

| Number | Country | Date |
|---|---|---|
| 267,818 | Germany | Nov. 29, 1913 |
| 419,121 | Great Britain | Nov. 6, 1934 |
| 509,308 | Great Britain | July 11, 1939 |
| 685,065 | France | Mar. 25, 1930 |

OTHER REFERENCES

Feldman article in Am. Jour. of Ophthalmology, vol. 25, Nov. 1942; pp. 1357–1361.